United States Patent Office 3,517,989
Patented June 30, 1970

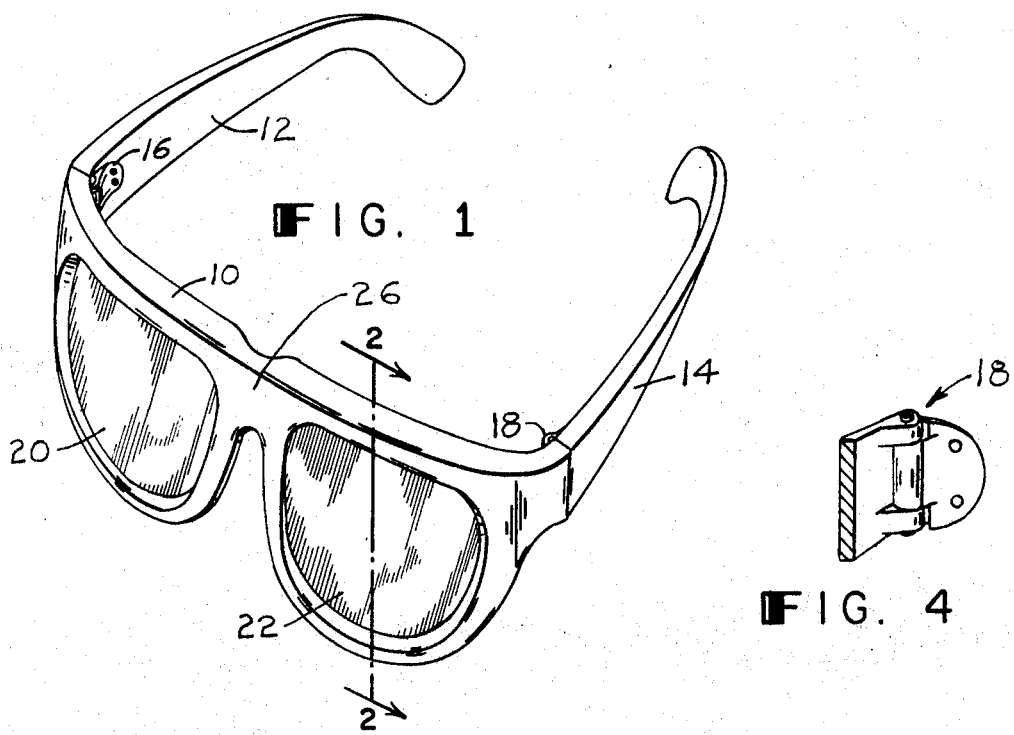
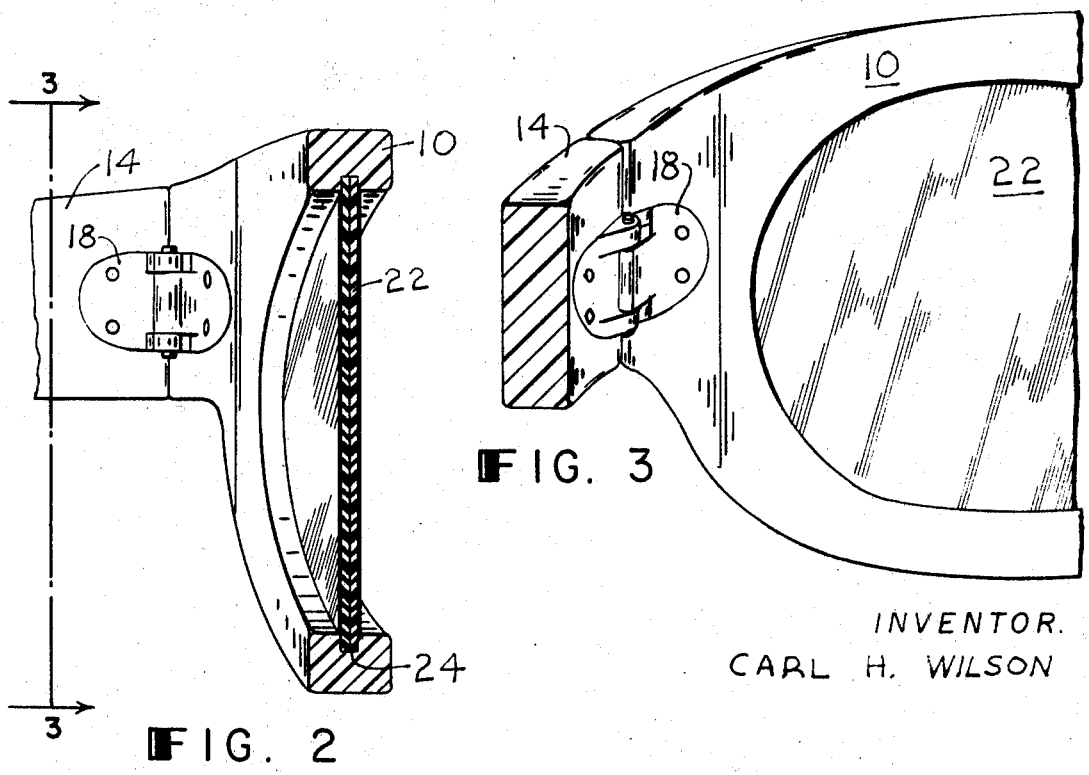

3,517,989
SPECTACLES
Carl H. Wilson, Waban, Mass., assignor to Foster Grant Co., Inc., Leominster, Mass., a corporation of Delaware
Filed Oct. 30, 1968, Ser. No. 771,799
Int. Cl. G02c 1/00
U.S. Cl. 351—43    3 Claims

ABSTRACT OF THE DISCLOSURE

A pair of spectacles having particular relationships in terms of size and specific gravity which provide sufficient buoyancy to float in water.

---

This invention relates generally to spectacles and more particularly to spectacles designed to float in water.

An object of this invention is to provide a pair of spectacles, sunglasses, or the like which have sufficient buoyancy to float in water.

Another object of this invention is to provide the necessary buoyancy by means of specific relationships between the various parts of the spectacles in terms of size and specific gravities.

Still another object of this invention is to provide floatable spectacles which may be made from material capable of being formed by conventional molding methods and apparatus.

Other objects and advantages will appear from the drawing and specification.

In the drawings:
FIG. 1 is a front perspective view of a pair of spectacles according to my invention;
FIG. 2 is a partial section view taken substantially along line 2—2 of FIG. 1;
FIG. 3 is a section view taken substantially along line 3—3 of FIG. 2;
FIG. 4 is a perspective view of a hinge for a pair of spectacles.

Generally, the present invention includes a pair of spectacles such as sunglasses having a front frame 10 and temple pieces 12 and 14 connected thereto by means of hinges 16 and 18 respectively. Lenses 20 and 22 are retained in the front frame 10 by means of grooves, shown at 24 in FIG. 2. The lenses are separated by means of a bridge section 26.

The lenses 20 and 22 may be of conventional material such as plastic, glass, or a laminated polarizing material. In accordance with this invention, the front frame 10 and temple pieces 12 and 14 are made of a material having a specific gravity appreciably below 1.0. Front frame 10 and temple pieces 12 and 14 are made of sufficient size or displacement to provide buoyancy to the entire article, including lenses and hinges, in water. To accomplish this, the cross-sectional area of the front frame 10 and temple pieces 12 and 14 may be made of sufficient size to provide a specific gravity for the composite article of below 1.0 to permit it to float in water. Specifically, the properties of the components of the spectacles should be in accordance with the following expression:

$$V_1(SG_1) + V_2(SG_2) + V_3(SG_3) < (V_1 + V_2 + V_3)SG_w$$

where $V_1$ is the displacement of the frame front and temple pieces,
$SG_1$ is the specific gravity of the material from which the frame front and temple pieces are made,
$V_2$ is the displacement of the lenses,
$SG_2$ is the specific gravity of the material from which the lenses are made,
$V_3$ is the displacement of the hinge parts,
$SG_3$ is the specific gravity of the material from which the hinge parts are made,
$SG_w$ is the specific gravity of water, or 1.0.

EXAMPLE I

Spectacles according to this invention are constructed as follows:

The frame front 10 and temples 12 and 14 are made from polypropylene. The lenses are made of a laminated polarizing film. The hinges and rivets are metallic.

$V_1 = 3.00$ cubic inches.
$SG_1 = 0.90$.
$V_2 = 0.30$ cubic inch.
$SG_2 = 1.20$.
$V_3 = 0.03$ cubic inch.
$SG_3 = 8.80$.

Using the expression $V_1(SG_1) + V_2(SG_2) + V_3(SG_3) < (V_1 + V_2 + V_3)SG_w$ $3.00(.90) + .30(1.20) + .03(8.80) < (3.00 + .30 + .03)1$ $2.70 + .36 + .26 < 3.00 + .30 + .03$ $3.32 < 3.33$ Since 3.32 is less than 3.33, the spectacles will float in water.

EXAMPLE II

The frame front 10 and temples 12 are made from a foamed plastic material having a specific gravity of, for example, 0.50.

$V_1 = 1.80$ cubic inches.
$SG_1 = 0.40$.
$V_2 = 0.40$ cubic inch.
$SG_2 = 1.20$.
$V_3 = 0.03$ cubic inch.
$SG_3 = 8.80$.

Using the above expression again, $1.80(.4) + .4(1.2) + .03(8.8) < (1.80 + .4 + .03)1$ $.72 + .48 + .26 < 2.23$ $1.46 < 2.23$ Here again, 1.46 being less than 2.23, the spectacles will float in water.

The front frame 10 may be any of a number of different designs or configurations and the lenses may be one or two pieces.

Many different materials would, of course, be suitable for use in making the frame 10 and temples 12 and 14. Plastic foam is an example of material which may be desirable. Also, it may be desirable in some instances to use hinges made of a lighter or non-corrosive material. Hinges integral with the frame and temple, with a pin of a material such as nylon may also conveniently be used.

It will be recognized that sunglasses or other spectacles made in accordance with this invention will be very advantageous in fishing, boating, or other water sports.

It will be understood that various changes in the details, materials, steps and arrangement of parts, which have been herein described and illustrated in order to explain the nature of the invention, may be made by those skilled in the art within the principle and scope of the invention as expressed in the appended claims.

I claim:
1. A pair of spectacles including lenses and frame, said frame being made of a material having a specific gravity sufficiently less than about 1.0 and of a volume great enough to buoyantly support said spectacles in a body of water when said lenses have a specific gravity appreciably above 1.0.

2. A pair of spectacles including lenses and a frame having temple pieces attached thereto by metal hinges, said frame being made of a plastic material having a specific gravity sufficiently below about 1.0 and of a volume great enough to buoyantly support said frame, lenses and hinges in a body of water when said lenses and said hinges have specific gravities appreciably above 1.0.

3. A pair of spectacles including lenses and a frame having temple pieces attached thereto by metal hinges, said frame being made of a plastic material having a specific gravity of between about .40 and about .95 and being of a volume great enough to buoyantly support said frame, lenses and hinges when said lenses and hinges have specific gravities appreciably above about 1.0.

References Cited

UNITED STATES PATENTS 3,038,375  6/1962  Gansz _____ 351—43

JOHN K. CORBIN, Primary Examiner

R. L. SHERMAN, Assistant Examiner